3,740,279
ETHYLENE COPOLYMER COMPOSITE
PROPELLANT
Dewey R. Levering and Carl A. Lukach, Wilmington, Del., assignors to Hercules Incorporated, Wilmington, Del.
No Drawing. Filed Sept. 2, 1969, Ser. No. 854,754
Int. Cl. C06d 5/06
U.S. Cl. 149—19  8 Claims

ABSTRACT OF THE DISCLOSURE

Composite propellant compositions having superior physical properties and performance characteristics contain solid oxidizer and as the binder fuel, colloidally dispersible crystallizable copolymer of ethylene and 2 to 25 mole percent of at least one other monomer which is an α-olefin and/or a non-conjugated hydrocarbon diene.

---

This invention relates to solid composite propellant compositions and more particularly to solid composite propellant compositions comprising finely divided oxidizing agent dispersed in an ethylene copolymer binder-fuel.

Solid composite propellant compositions are ordinarily composed of an inorganic oxidizing material such as ammonium perchlorate and a light metal fuel such as aluminum dispersed in a resin binder which serves to hold together the inorganic particles and is itself a fuel. Typically, the resin binder is a polyurethane or a carboxyl- or hydroxyl-terminated polybutadiene of low molecular weight cured with a polyfunctional epoxide, aziridine or isocyanate. The mechanical properties of such propellant compositions are dependent to a large extent upon the particular resin employed as the binder-fuel, the concentration, size and shape of the oxidizer particles and the strength of the bond between the binder resin and the oxidizer particles. For example, when a propellant is deformed in any way, the binder resin must be capable of absorbing the change by elongation or compression. Thus, high elongation is a very important requirement of a binder and the tensile strength and modulus must be high enough to prevent creeping of the propellant. Moreover, because of the temperature extremes to which such propellants are subjected, it is most desirable that the above properties be retained over a wide temperature range. Also, because of the high solids loading requirement of such compositions, it is necessary that the binder be capable of retaining large amounts of inorganic solid materials without detriment to the above desirable properties.

Now, in accordance with this invention, it has been found that when certain finely divided copolymers of ethylene are used as the resin-fuel component to produce solid composite propellants, propellants of unexpected superior physical properties and performance characteristics are obtained.

Accordingly the present invention relates to a solid composite propellant composition comprising solid oxidizer and a polymeric binder consisting essentially of a solid, colloidally dispersible copolymer of ethylene and 2 to 25 mole percent of at least one other monomer which is an alpha-olefin having 3 to 20 carbon atoms or a non-conjugated hydrocarbon diene, said copolymer having an average primary particle size within the range of 0.02 to 0.5 micron, being more than 50% crystallizable and exhibiting a crystallinity equal to less than 90% of the inherent crystallinity of polyethylene, to a method for producing a propellant therefrom, and the propellant so produced.

The ethylene copolymer which is used as binder in accordance with this invention is, as stated, a crystallizable copolymer of ethylene and 2 to 25 mole percent, preferably 7 to 20 mole percent and most preferably 10 to 15 mole percent of at least one other monomer which is an α-olefin or a diene, in the form of extremely finely divided particles within the colloidal size range. By the term "crystallizable copolymer" as employed in this specification is meant a copolymer of which at least about 50% is in the crystalline form or is structurally capable of assuming the crystalline form. This is in contrast to a totally amorphous material which cannot assume the crystalline form. It is not intended to include totally amorphous copolymers within the scope of the instant invention. The ethylene copolymer can be either the random (statistical) type wherein the other monomer (or monomers) is distributed randomly throughout the molecule, or the block type wherein the other monomer (or monomers) is present only in relatively clearly defined segments within the molecule.

These crystallizable copolymers comprise substantially continuous networks of polymer which is essentially non-spherulitic and is either in the monoclinic or smectic state which exhibits a fine fibrous structure by electron microscopy. Ths continuous polymer network is believed to benefit the propellant composition by effecting a stiffening action or increased modulus, a reduction in tackiness, modification of the flow properties and an increase in strength and elongation. All such benefits, of course, are not realized with every copolymer within the scope of the invention.

The monomers which are copolymerizable with ethylene to give the copolymers of this invention are, as stated, the α-olefins containing 3 to 20 carbon atoms and/or non-conjugated hydrocarbon dienes. Exemplary of the α-olefins which can be used are propylene, butene-1, pentene-1, 3-methyl-butene-1, hexene-1, 4-methyl-pentene-1, heptene-1, octene-1, decene-1, dodecene-1, tetradecene-1, hexadecene-1, octadecene-1, eicosene-1, styrene and the alkyl and halo-styrenes such as p-chlorostyrene, p-methylstyrene and the like. The non-conjugated hydrocarbon dienes can be acyclic or alicyclic compounds and are preferably the aliphatic dienes containing 6 to 22 carbon atoms or the endocyclic dienes, i.e., bridged ring hydrocarbons containing two double bonds including endo and exo isomers of such hydrocarbons. Exemplary of the aliphatic dienes which can be used are 1,4-hexadiene;
4-methyl-1,4-hexadiene;
1,9-octadecadiene;
6-methyl-1,5-heptadiene;
7-methyl-1,6-octadiene;
11-ethyl-1,11-tridecadiene;
9-ethyl-1,9-undecadiene;
7-ethyl-1,7-nonadiene;
8-propyl-1,8-undecadiene;
8-ethyl-1,8-decadiene;
10-ethyl-1,9-dodecadiene;
12-ethyl-1,12-tetradecadiene;
13-n-butyl-1,12-heptadecadiene; and
15-ethyl-1,15-heptadecadinene.

Exemplarly of the endocyclic dienes are dicyclopentadiene;
tricyclopentadiene;
tetracyclopentadiene;
bicyclo(2,2,1) hepta-2,5-diene;
bicyclo(2,2,2) octa-2,5-diene;
5-methylene-2-norbornene;
5-ethylidene-2-norbornene;
5-(2'-butenyl)-2-norbornene;
5-(1'-propenyl)-2-norbornene;
5-(2'-ethyl-2'-butenyl)-2-norbornene;

5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene;
5-(2'-octyl-2'-butenyl)-2-norbornene;
5-(2'-ethyl-2'-decenyl)-2-norbornene;
5-(2'-ethyl-1'-octenyl)-2-norbornene;
2-methyl-2,5-norbornadiene;
2-ethyl-2,5-norbornadiene;
2-butyl-2,5-norbornadiene; and
2-octyl-2,5-norbornadiene.

The small particles of copolymer exist in the form of discrete, primary particles and reversible clusters of these discrete particles which can be up to about 5 microns in size. By reversible cluster is meant a very lightly held group of primary particles which can be readily disintegrated to reform the primary particles. Disintegration of such particles can be brought about very simply by, for example vigorous agitation.

The small particles of copolymers which are used in the compositions according to the instant invention can be prepared by any technique which will result in sufficiently small particles of the desired crystallinity and which can be dispersed in inert media. A very effective procedure for preparing colloidally dispersible copolymers of ethylene is described in Belgian Pat. No. 708,834.

The unique combination of properties of the ethylene copolymer particles of this invention permits them to be suspended or dispersed in liquid media to form very stable dispersions. Such dispersions can be prepared conveniently by employing the desired diluent as the medium for the polymerization. However, it is also practical to prepare the polymer in a relatively volatile diluent as, for example, heptane, hexane, butane, propane, etc., and then displace that diluent with a more inert diluent for storage or utilization. This diluent transfer is easily accomplished by adding the new diluent to the suspension and thereafter boiling off the original diluent under conditions whereby the new diluent does not also vaporize. Alternatively, the dispersion can be centrifuged to separate the particles, the original diluent decanted, the new diluent added and the particles redispersed by shaking. This diluent transfer can readily be effected without changing the size of the copolymer particles. Surprisingly, the diluent transfer can even be accomplished from organic medium to water, although a suspending agent is usually used in this case.

The colloidal dispersions can be used as such to form the propellant composition, can be dried, i.e., the diluent removed, to leave a substantially solvent-free mass which is then mixed with the other propellant ingredients or, if desired, can be redispersed in a diluent to re-form a colloidal dispersion. The solid, crystallizable copolymer, obtained on drying the colloidal dispersions, is characterized by the primary particles having retained their colloidal size, i.e. an average particle size of from 0.02 to 0.5 micron. The dried copolymer will be in the form of clusters which are readily redispersed in a liquid, nonsolvent diluent to form a stable dispersion of the original primary particles and which dispersion is essentially free of irreversible clusters of particles greater than about 5 microns. Removal of the diluent from the colloidal dispersions can be effected by any of the known methods such as spray-drying, vacuum stripping, drum drying, and the like, the diluent removal being carried out at a temperature below about 100° C., and preferably below about 40° C.

As stated above, the copolymer particles are colloidal in nature, having in their maximum dimension an average primary particle size of from about 0.02 to about 0.5 micron, and the copolymer is more than 50% crystallizable and exhibits a crystallinity equal to or less than 90% of the inherent crystallinity of polyethylene. The crystallizable copolymer can be of any desired molecular weight and generally will be one having a reduced specific viscosity of from about 1 to about 40 or higher. Reduced specific viscosity (RSV) is defined as the ratio of the specific viscosity (determined on a 0.1% solution of dried copolymer in decahydronaphthalene at 135° C.) to concentration of this 0.1% solution.

The solid oxidizer component of the propellants of this invention can be an inorganic or an organic oxidizing agent. Typical solid inorganic oxidizing agents include such inorganic salts as the ammonium, alkali metal, or alkaline earth metal salts of nitric, perchloric, or chloric acids or mixtures thereof, and particularly such salts as ammonium perchlorate, sodium perchlorate, potassium perchlorate, magnesium perchlorate, lithium chlorate, strontium chlorate, potassium nitrate, sodium nitrate, calcium nitrate, ammonium nitrate, and the like. Solid organic oxidizers such as cyclotetramethylene tetranitramine, cyclotrimethylene trinitramine, nitroguanidine, pentaerythritol tetranitrate and the like are also suitable and can be used alone or a mixtures with other, each other or with any of the above inorganic oxidizing salt, if desired.

In addition to the above-named ingredients, the propellant can also contain other additives such as metal fuels, plasticizers, and the various compounding ingredients commonly employed in making composite propellants, as for example, oxidation inhibitors, reinforcing agents, wetting agents, surfactants, ballistic modifiers, radar attenuators, burning rate modifiers, and the like. In this connection, metal fuels such as powdered aluminum, beryllium, magnesium, zirconium or boron, alloys such as the aluminum alloys of boron, magnesium, manganese, copper, and the like, and plasticizers such as dioctyl phthalate, dioctyl azelate, di-e-ethylhexyl adipate, didecyl adipate, dioctyl sebacate, dibutylphosphate, polybutadiene, polyisobutylene, naphthenic processing oils and the like can be utilized. Certain well-known surfactants such as lecithin or mixtures of sorbitan monooleate and polyoxyethylene esters of mixed fatty and resin acids, ballistic modifiers such as di-n-butyl ferrocene, iron oxide, chromium oxide or oxamide, radar attenuators such as molybdenum trioxide, and the like can also be present in minor amounts within the scope of the invention.

The propellant formulations of this invention have, in general, the following composition range:

|  | Weight percent |
|---|---|
| Solid oxidizer | 60–97 |
| Copolymer binder | 3–40 |
| Metal fuel | 0–20 |
| Plasticizer | 0–20 |

Preferably, the propellant compositions contain about 80 to about 90 weight percent solid oxidizer, from about 10 to about 20 weight percent copolymer binder, about 0 to about 7 percent metal fuel, and about 0 to about 10 percent plasticizer.

The propellant is prepared by intimately blending or mixing the ingredients using conventional techniques and standard equipment well known to those skilled in the art as suitable for the purpose. The copolymer ingredient can be added dry or as a colloidal dispersion of the copolymer in a suitable diluent and the diluent removed prior to molding. The use of a colloidal dispersion containing from about 2 to about 80% and preferably from about 5 to about 50% copolymer solids is preferred.

The molding of the composition into a propellant grain can be carried out at a temperature of 80 to 170° C. and usually under pressures ranging from about 1,000 to 20,000 p.s.i.

The invention is further illustrated by the following examples in which parts and percentages are by weight unless otherwise specified. The ethylene copolymers used in the examples were prepared in the following manner.

A nitrogen filled reaction vessel, equipped with an agitator and cooled to 0° C. by ice water, was charged with one mole of titanium tetrachloride added as a 25% solution in a purified petroleum fraction (boiling range 165–200° C.) over a period of 4 hours. There was then added 1.3 moles of ethylaluminum sesquichloride as a 25% solution in the purified petroleum fraction. The reaction mixture was agitated an additional 2 hours at 0° C. and then was allowed to warm to room temperature, after which it was heated to 80–85° C. for 3 hours to complete the reduction of tetravalent titanium to trivalent titanium. The titanium trichloride-containing precipitate was separaeted and washed with portions of kerosene, after which it was held at 100° C. for 24 hours to complete the activation of the catalyst.

A nitrogen filled reaction vessel was charged with 200 ml. of n-heptane, 12 millimoles of diethylaluminum chloride and 6 millimoles of the above prepared titanium trichloride catalyst. With the temperature adjusted to 50° C., there was then added 88 millimoles of n-octene-1 in a single injection. The mixture was held for 1 hour at 50° C. during which time the titanium trichloride dispersed to a translucent red colloid.

To another reaction vessel equipped with a stainless steel head, cooling coils and an air driven stirrer were charged 2 liters of n-heptane. The reactor was evacuated and pressured to 30 p.s.i.g. with a gas mixture containing ethylene and the desired mole percent of the other monomer or monomers at 50° C. Then 20 millimoles of diethylaluminum chloride was added to the reactor. Addition of the colloidal titanium trichloride catalyst was begun and continued at a rate to maintain constant gas pressure in the reactor head space during the reaction period which was 54 minutes. Ethylene and the other monomer(s) were continuously monitored into the reactor for the entire reaction time through rotometers such that the mole ratio of the feed gas remained constant at the desired ethylene to monomer(s) ratio. At the end of 54 minutes, the reaction mass was quenched by adding 20 ml. of n-butanol, then agitated for about 16 hours at 50° C. The mixture was washed with 5% hydrochloric acid and three times with distilled water to remove deactivated catalyst residues. The copolymer was recovered as a stable milky suspension.

EXAMPLES 1–2

Two propellant compositions were prepared using an ethylene-propylene copolymer dispersion of 5.9% solids prepared according to the above procedure in n-heptane as diluent, the copolymer particles being less than 0.5 micron in size and there were no clusters of particle larger than 4 microns. The copolymer was about 71% crystalline, had a heat of fusion of 16.2 calories/gram (heat of fusion of an ethylene homopolymer similarly prepared was 38.3 calories/gram) a propylene content of 14 mole percent and an RSV of 18. The formulations for these compositions contained the following ingredients.

| Ingredients | Example (parts by weight) | |
|---|---|---|
| | 1 | 2 |
| Cyclotetramethylene tetranitramine | 90 | 85 |
| Ethylene-propylene copolymer dispersion | 85 | 125 |
| Plasticizer [1] | 5 | 7.5 |

[1] A naphthenic processing oil containing 21% aromatic type carbons, 39% naphthenic type carbons and 40% paraffinic type carbons, and having the following physical properties: average molecular weight 395; pour point, 10° F.; aniline point, 172° F.; fire point 495° F.; and flash point 430° F.

The above ingredients were combined in an unheated Hobart mixer and agitated under vacuum until most of the heptane had been evacuated. The resultant cake which was uniform in both color (white) and consistency was placed on an aluminum tray and forced air dried at 55° C. to a moisture and volatile content of 0.03% (approximately 2 days).

The dried propellant composition of Example 1 was compression moded into 0.436 inch diameter grains, 0.812 inch long at 138° C. and 10,750 p.s.i. pressure with a hold time under pressure of 1 minute. The molded grains were well consolidated, had a density of 1.6 gm./cc., and could not be manually crushed or deformed. Tests on the molded grains showed an average compressive strength of 1079 lb./in.$^2$, an average Youngs modulus of 25,940 p.s.i., impact sensitivity of 40.9 cm., friction sensitivity of 263 lbs. at 8 ft./sec. and sensitivity to electrostatic discharge at 6.25 joules.

Nine hundred parts of the dried propellant composition of Example 2 was compressed into a solid block at ambient temperature using a 2½ inch press and 16,156 p.s.i.g. for 15 minutes, after which the block was conditioned by heating to 138–143° C. in an electric oven maintained at 143° C. The heated block was immediately transferred from the oven to an extruder and then converted into approximately ⅛ inch diameter strands using a 0.513 inch die and 4,600 to 6,300 p.s.i.g. The physical properties and ballistic properties, as determined on these strands, are recorded below, the results being the average of several determinations.

Properties

Tensile strength (p.s.i.):
 −65° F. ------------------------------- 1230
 +70° F. ------------------------------- 763
 +165° F. ------------------------------ 566
Hodulus of elasticity (p.s.i.):
 −65° F. ------------------------------- 55,245
 +70° F. ------------------------------- 38,500
 +165° F. ------------------------------ 18,812
Elongation (percent):
 −65° F. ------------------------------- 9.7
 +70° F. ------------------------------- 19.1
 +165° F. ------------------------------ 33.1

| | Strand burning rate (inches/sec.) [1] | | | | |
|---|---|---|---|---|---|
| Pressure (p.s.i.g.) | 300 | 600 | 1,000 | 1,800 | 2,800 |
| −65° F. | 0.033 | 0.052 | 0.075 | 0.128 | 0.193 |
| 70° F. | 0.039 | 0.060 | 0.086 | 0.158 | 0.222 |
| 165° F. | 0.047 | 0.065 | 0.096 | 0.163 | 0.227 |

[1] Strands 3.5″ long (inhibited with the reaction product of epichlorohydrin and bisphenol A) and burned at various pressures and temperatures in a nitrogen atmosphere.

Sensitivity:
 Impact (cm.) ------------------------- 20.9
 Friction (lbs.) at 8 ft./sec. -------- 486
 Electrostatic discharge (jowles) ----- 6.25

EXAMPLES 3–5

Propellant compositions were prepared according to the procedure of Example 2 except that in these examples, various ethylene copolymer dispersions were substituted for the ethylene-propylene copolymer dispersion. The amount of copolymer present in each of the formulations, based on dry solids was the same as that of Example 2.

Characterizations of the copolymers and dispersions used in these examples are tabulated below.

|  | Example numbers | | |
| --- | --- | --- | --- |
|  | 3 | 4 | 5 |
| Ethylene copolymer: | | | |
| Mole percent propylene | 7.8 | 22 | 7 |
| Mole percent 4-methyl-5,4-hexadiene | | | 3-4 |
| RSV | 29 | 5.3 | 31.3 |
| Particle size (μ): | | | |
| Range | <1 to 5 | <1 to 5 | <1 to 5 |
| Average | 1 | 1 | 1 |
| Crystallinity (percent) | 76 | 53 | 71 |
| Dispersion: | | | |
| Percent solids | 10.5 | 6 | 6.9 |
| Amount used (parts) | 71 | 125 | 109 |

A comparison of the ballistic and physical property determinations (at 70° F.) of the propellant compositions of these examples and those of Example 2 indicated that the ballistic properties were similar. Tensile strength and modulus values for Examples 3 and 5 were higher than those of Example 2, where as elongation was lower. All of the physical property values for Example 4 were lower than Example 2. The addition of curing agent to the formulation of Example 5 resulted in a further increase in tensile strength and modulus and a decrease in elongation, indicating that cross-linking involving the unsaturated linkages had occurred.

EXAMPLE 6

A propellant composition was prepared according to the general procedure of Example 2 using the copolymer dispersion of Example 3, the formulation containing the following ingredients.

Ingredients: Parts by weight
Cyclotetramethylene tetranitramine _____ 80
Ethylene-propylene copolymer dispersion
(10.5% solids) _____ 115
Plasticizer of Example 1 _____ 8

The propellant exhibited much higher tensile strength and modulus and slightly lower elongation than the propellant of Example 3.

EXAMPLE 7

A propellant composition was prepared by mixing the following ingredients in an unheated mixer equipped with an agitator and maintained under vacuum.

Ingredients: Parts by weight
Ammonium perchlorate:
10μ particle size _____ 16
200μ particle size _____ 32
400μ particle size _____ 31
Aluminum (10μ) _____ 5
Ethylene-propylene copolymer dispersion of Example 4 (6% solids) _____ 67
Plasticizer of Example 1 _____ 12

Solvent removal, drying, conditioning and extrusion were carried out in the manner of Example 2 except that the temperature was not permitted to exceed 100° C. The physical properties of the propellant composition as determined on the strands at 77° F. indicated a tensile strength of 90 p.s.i., a modulus of 484 p.s.i. and an elongation of 60%.

What we claim and desire to protect by Letters Patent is:

1. A solid composite propellant comprising an intimate mixture of solid oxidizer and a polymeric binder consisting essentially of a solid copolymer of ethylene and 2 to 25 mole percent of at least one other monomer which is an alpha-olefin having 3 to 20 carbon atoms or a nonconjugated hydrocarbon diene, said copolymer having an average particle size within the range of 0.02 to 0.5 micron, being more than 50% crystallizable and exhibiting a crystallinity equal to less than 90% of the inherent crystallinity of polyethylene.

2. The propellant of claim 1 wherein the copolymer is a copolymer of ethylene and propylene.

3. The propellant of claim 1 wherein the copolymer is a terpolymer of ethylene, propylene and 4-methyl-1,4-hexadiene.

4. The propellant of claim 1 comprising by weight of the propellant about 60 to about 97 percent solid oxidizer, about 3 to about 40 percent polymeric binder, 0 to about 20 percent metal fuel, and 0 to about 20 percent plasticizer.

5. The propellent of claim 2 comprising by weight of the propellant about 80 to about 90 percent solid oxidizer, about 10 to about 20 percent polymeric binder, 0 to about 7 percent metal fuel, and 0 to about 10 percent plasticizer.

6. The propellant of claim 3 comprising by weight of the propellant about 80 to about 90 percent solid oxidizer, about 10 to about 20 percent polymeric binder, 0 to about 7 percent metal fuel, and 0 to about 10 percent plasticizer.

7. The propellant of claim 5 wherein the solid oxidizer is cyclotetramethylene tetranitramine.

8. The propellant of claim 5 wherein the solid oxidizer is ammonium perchlorate.

References Cited
UNITED STATES PATENTS

| 3,138,501 | 6/1964 | Wright | 149—92 |
| 3,147,162 | 9/1964 | Paul | 149—19 |
| 3,227,588 | 1/1966 | Jones et al. | 149—18 |
| 3,296,041 | 1/1967 | Wright | 149—2 |
| 3,367,115 | 2/1968 | Spenadel et al. | 60—219 |
| 3,449,179 | 6/1969 | Mine Kawa et al. | 149—19 |
| 3,462,952 | 8/1969 | D'Alelio | 60—219 |
| 3,520,742 | 7/1970 | Witz | 149—7 |

CARL D. QUARFORTH, Primary Examiner

E. A. MILLER, Assistant Examiner

U.S. Cl. X.R.

149—21, 44, 76, 92, 113